(12) United States Patent
Bookbinder et al.

(10) Patent No.: US 10,295,734 B2
(45) Date of Patent: May 21, 2019

(54) OPTICAL FIBER FOR BOTH MULTIMODE AND SINGLE-MODE OPERATION AND TRANSMISSION SYSTEM THEREFOR

(71) Applicant: Corning Incorporated, Corning, NY (US)

(72) Inventors: Dana Craig Bookbinder, Corning, NY (US); Xin Chen, Painted Post, NY (US); John Douglas Coleman, Maiden, NC (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/588,047

(22) Filed: May 5, 2017

(65) Prior Publication Data

US 2017/0336559 A1 Nov. 23, 2017

Related U.S. Application Data

(60) Provisional application No. 62/337,612, filed on May 17, 2016.

(51) Int. Cl.
*G02B 6/28* (2006.01)
*G02B 6/028* (2006.01)
(Continued)

(52) U.S. Cl.
CPC ....... *G02B 6/0288* (2013.01); *G02B 6/02023* (2013.01); *G02B 6/0281* (2013.01);
(Continued)

(58) Field of Classification Search
CPC .......... G02B 6/0288; G02B 6/02023; G02B 6/4453; G02B 6/3885; G02B 6/4471; G02B 6/3893; H04B 10/40
See application file for complete search history.

(56) References Cited

U.S. PATENT DOCUMENTS 7,088,900 B1 * 8/2006 Mishra .................. C03C 3/06
385/123
8,977,092 B2 * 3/2015 Bickham .............. G02B 6/0288
385/124

(Continued)

FOREIGN PATENT DOCUMENTS

EP 2642322 A1 9/2013
WO 2011100333 A1 8/2011
(Continued)

OTHER PUBLICATIONS

Lenahan, "Calculation of Modes in an Optical Fiber Using the Finite Element Method and EISPACK," Bell Sys. Tech. J., vol. 62, pp. 2663-2695 (1983).

(Continued)

*Primary Examiner* — Ellen E Kim
(74) *Attorney, Agent, or Firm* — Robert L. Carlson

(57) ABSTRACT

Disclosed is an optical fiber which includes a core including silica with a core diameter and having at least two dopants, a maximum relative refractive index delta of at least 0.7% and an alpha value in the range of 1.9-2.2. The core has a refractive index profile configured to transmit light in a multimode propagation at a first wavelength $\lambda_1$ in the range of 800-1100 nm and to propagate light in a LP01 mode at a second wavelength $\lambda_2$. The second wavelength $\lambda_2$ is greater than 1200 nm. The optical fiber is structured to have a LP01 mode field diameter in the range of 8.5-12.5 μm at 1310 nm.

20 Claims, 11 Drawing Sheets

(51) Int. Cl.
*G02B 6/02* (2006.01)
*G02B 6/38* (2006.01)
*G02B 6/44* (2006.01)
*H04B 10/40* (2013.01)
*G02B 6/036* (2006.01)

(52) U.S. Cl.
CPC ......... *G02B 6/3885* (2013.01); *G02B 6/3893* (2013.01); *G02B 6/4453* (2013.01); *G02B 6/4471* (2013.01); *H04B 10/40* (2013.01); *G02B 6/028* (2013.01); *G02B 6/0365* (2013.01)

(56) References Cited

U.S. PATENT DOCUMENTS

| | | | |
|---|---|---|---|
| 9,075,215 B2* | 7/2015 | Hurley | G02B 6/4432 |
| 2003/0161597 A1 | 8/2003 | Berkey et al. | |
| 2006/0034575 A1 | 2/2006 | Sako et al. | |
| 2007/0196061 A1 | 8/2007 | Bickham et al. | |
| 2013/0322836 A1 | 12/2013 | Bickham et al. | |
| 2014/0119701 A1 | 5/2014 | Chen et al. | |
| 2015/0063754 A1* | 3/2015 | Li | G02B 6/262 385/50 |
| 2015/0331181 A1* | 11/2015 | Chen | G02B 6/02004 385/124 |
| 2016/0091660 A1 | 3/2016 | Li et al. | |
| 2016/0274300 A1* | 9/2016 | Li | G02B 6/0288 |
| 2017/0068046 A1 | 3/2017 | Bickham et al. | |
| 2017/0242186 A1* | 8/2017 | Mishra | G02B 6/0288 |

FOREIGN PATENT DOCUMENTS

| | | |
|---|---|---|
| WO | 2014021894 A2 | 2/2014 |
| WO | 2014206464 A1 | 12/2014 |

OTHER PUBLICATIONS

International Search Report and Written Opinion of the International Searching Authority; PCT/US2017/032813; dated Aug. 2, 2017; 13 pages; European Patent Office.

* cited by examiner

OPTICAL FIBER FOR BOTH MULTIMODE AND SINGLE-MODE OPERATION AND TRANSMISSION SYSTEM THEREFOR

This application claims the benefit of priority under 35 U.S.C. § 119 of U.S. Provisional Application Ser. No. 62/337,612 filed on May 17, 2016 the content of which is relied upon and incorporated herein by reference in its entirety.

FIELD

The present disclosure relates to optical fibers capable of multimode and single-mode transmission, and transmission systems utilizing such fiber.

BACKGROUND

Optical fiber transmission systems are employed in data centers to optically connect one optical device (e.g., a router, a server, a switch, etc.) with one or more other optical devices.

Current data centers are typically configured with multimode optical fibers coupled to 850 nm multimode vertical-cavity surface-emitting laser (VCSELs) light sources that provide modulated data signals to the multimode fibers. Such multimode fibers are used because the light sources in the transceivers in the optical devices are multimode light sources. Historically, it has been easier to work with multimode fiber than single-mode fiber. Unfortunately, multimode fiber may have a smaller bandwidth-distance product due to modal dispersion, which may make it difficult and expensive to extend the reach of the optical fiber transmission system while maintaining high-bandwidth transmission. Furthermore, utilizing a typical transmitter (that utilizes an 850 nm VCSEL) operating at 10 Gb/s as a source, current standard optical multimode 3 (OM3) and optical multimode 4 (OM4) multimode optical fibers can transmit optical signals over a distance typically of only about 300 m to about 500 m, due to signal distortion caused by the modal dispersion and chromatic dispersion introduced by silica material of these multimode fibers. As optical transmission speed moves to 25 Gb/s or higher, this distance becomes even shorter (e.g., about 10 m to 100 m) for the current standard OM3 and OM4 multimode optical fibers operating at around 850 nm.

SUMMARY

According to one embodiment of the present disclosure, an optical fiber includes a core including silica with a core diameter and having at least two dopants, a maximum relative refractive index delta of at least 0.7% and an alpha value in the range of 1.9-2.2. The core has a refractive index profile configured to transmit light in a multimode propagation at a first wavelength $\lambda_1$ in the range of 800-1100 nm and to propagate light in a LP01 mode at a second wavelength $\lambda_2$. Thus, the fibers are capable of single mode propagation at the second wavelength. The second wavelength 2 is greater than 1200 nm. In some embodiment, the optical fiber is structured to have a LP01 mode field diameter in the range of 8.5-12.5 µm at a wavelength of 1310 nm. In some embodiments the optical fiber is structured to have a LP01 mode field diameter in the range of 8.5-12 µm at a wavelength of 1310 nm. In some embodiments the optical fiber is structured to have a LP01 mode field diameter in the range of 8.5-11.5 µm at 1310 nm. In some embodiments the optical fiber is structured to have a LP01 mode field diameter in the range of 9.5-13 µm at 1550 nm. In some embodiments the optical fiber is structured to have a LP01 mode field diameter in the range of 9.5-12 µm at 1550 nm.

According to another embodiment of the present disclosure, an optical fiber has a core with a core diameter, a maximum relative refractive index delta of at least 0.7% and an alpha value in the range of 1.9-2.2. A refractive index profile is configured to transmit light in a multimode propagation at greater than 2 GHz·km modal bandwidth at all wavelengths within a sub-window of at least 100 nm between a wavelength range of 800-1200 nm and to propagate light in a LP01 mode at another wavelength $\lambda_2$. The wavelength $\lambda_2$ is greater than 1200 nm and the optical fiber is structured to have a LP01 mode field diameter in the range of 8.5-12.5 µm at 1310 nm.

According to another embodiment of the present disclosure, an optical transmission system including a transceiver that generates at least one of a modulated light having an operating wavelength of greater than 1200 nm and modulated light having an operating wavelength in the range between 800-1100 nm, a interconnect module, a jumper cable optically coupling the transceiver and the module, and a trunk cable optically coupled to the module. At least one of the jumper cable and the trunk cable includes an optical fiber. In some embodiments at least two of the jumper cable, the trunk cable and the module include the optical fiber. In some embodiments the jumper cable, the trunk cable and the module include the optical fiber. The fiber includes a core including silica having a maximum relative refractive index delta of at least 0.7%, the core having a refractive index profile configured to transmit light in a multimode propagation at a first wavelength $\lambda_1$ between 800-1100 nm and to propagate light in a LP01 mode at a second wavelength $\lambda_2$. The second wavelength $\lambda_2$ is greater than 1200 nm. The optical fiber is structured to have a LP01 mode field diameter in the range of 8.5-12.5 µm at 1310 nm.

According to another embodiment of the present disclosure, an optical fiber includes a core having silica with a core diameter and having at least two dopants, a maximum relative refractive index delta of at least 0.7% and an alpha value in the range of 1.9-2.2. In some embodiments, the optical fibers described herein comprise a doped silica core include at least two dopants, wherein the two dopants may include $GeO_2$ and one of F, $P_2O_5$ or $B_2O_3$. The core has a refractive index profile configured to transmit light in a multimode propagation at a first wavelength $\lambda_1$ in the range of 800-1650 nm and to propagate light in a LP01 mode at a second wavelength $\lambda_2$. The second wavelength $\lambda_2$ is greater than 1200 nm. The optical fiber is structured to have a LP01 mode field diameter in the range of 8.5-12.5 µm at 1310 nm.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated into and constitute a part of this specification. The drawings illustrate one or more embodiment(s), and together with the description serve to explain principles and operation of the various embodiments.

DETAILED DESCRIPTION

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1A:
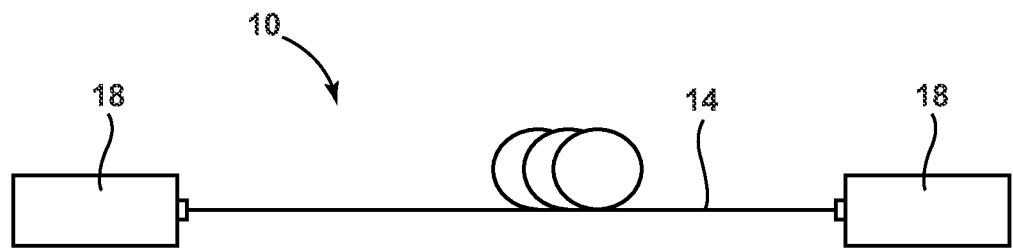
FIG. 1A is a schematic diagram of an optical fiber transmission system, according to one embodiment.
Figure 1B:
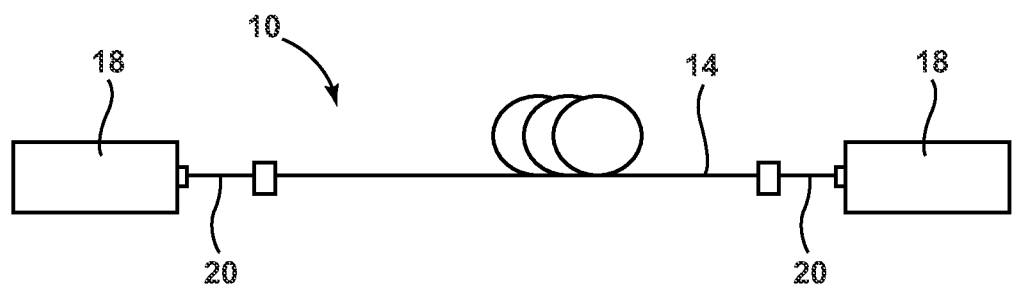
FIG. 1B is a schematic diagram of an optical fiber transmission system, according to another embodiment.
Figure 1C:
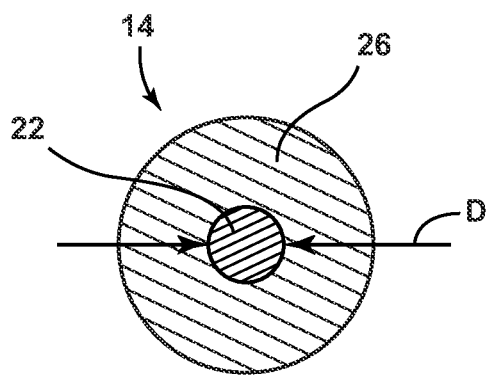
FIG. 1C is a cross-sectional view of an optical fiber, according to one embodiment.

Referring now to FIGS. 1A-C, an optical transmission system 10 is depicted that includes an optical fiber 14 and a plurality of transmission components 18. In the depicted embodiment, the optical fiber 14 is optically coupled to two transmission components 18, however, it will be understood that more than two transmission components 18 may be coupled with the optical fiber 14. Optionally, the optical transmission system 10 may include one or more connector cables 20 optically connected with the optical fiber 14 and the transmission components 18. The optical fiber 14 may be configured to transmit light in both multimode and single-mode propagation.

The transmission components 18 may include single-mode transmitters, multimode transmitters, single-mode transceivers and/or multimode transceivers. It will be understood that any description of a transmitter may equally be applied to a transceiver, and vice versa. In one specific embodiment, one of the transmission components 18 may be a single-mode transmitter or transceiver and the other transmission component may be a multimode transceiver. In another embodiment, both of the transmission components 18 may be single-mode transceivers or multimode transceivers. In single-mode transmitter and transceiver embodiments of the transmission components 18, the single-mode transmitter can be one that is used in an optical communications transceiver, such as an LR, LR4, CWDM4, PSM4 or CLR4 transceiver. The single-mode transmitter and/or transceiver emit modulated light, which has a second nominal wavelength $\lambda_2$, or operating wavelength, in a range of between about 950 nm and about 1700 nm and in particular at about 1060 nm (i.e., 1060 nm±10 nm), about 1200 nm (i.e., 1200 nm±10 nm), about 1310 nm (i.e., 1310 nm±10 nm), about 1510 nm (i.e., 1510 nm±10 nm), or at about 1550 nm (i.e., 1550 nm±10 nm). In another embodiment, the wavelength $\lambda_2$ is situated in a 1260 nm to 1340 nm wavelength band, or a 1540 nm to 1560 nm wavelength band, or a 1530 nm to 1611 nm wavelength band, or a 1565 nm to 1625 nm wavelength band, or a 1625 nm to 1675 nm wavelength band. In a preferred embodiment, the wavelength $\lambda_2$ is situated in a 1530 nm to 1570 nm wavelength band. Further, the nominal wavelength $\lambda_2$ light source can be, for example, 980 nm, 1060 nm, 1310 nm or 1550 VCSELs, or a silicon photonics laser source operating at either 1310 nm or 1550 nm, a state edge emitting laser, or a DFB (distributed feed-back) laser operating in a wavelength range of between about 950 nm to 1700 nm. In various embodiments, the single-mode transmitter and/or transceiver may operate, or emit modulated light, at one or more wavelengths simultaneously, or in quick succession, at one or more wavelengths (e.g., 2, 3, 4, 5, 6, 7, or 8 wavelengths). In a specific embodiment, the single-mode transceiver may operate at 4 or more wavelengths greater than about 1250 nm. The single-mode transmitter and/or transceiver is configured to propagate light in the optical fiber 14 in a fundamental mode (LP01), or single-mode, propagation. The single-mode transmitter and transceiver embodiments of the transmission components 18 may transmit data within or between data centers over distances in the range of 100 m to 2000 m with possible data rates of 10 Gb/s or higher (e.g., 25 Gb/s or higher, depending the system capability as limited by power budget and bandwidth of the optical fiber 14). Higher data rate could include 50 Gb/s or 56 Gb/s NRZ or 50 Gb/s using PAM4 modulation format with 25 Gbd or 28 Gbd, or 100 Gb/s using PAM4 modulation format with 50 Gbd or 56 Gbd.

In multimode transmitter and/or transceiver embodiments of the transmission components 18, the multimode transmitter and/or transceivers emit modulated light, which has a first nominal wavelength $\lambda_1$ in a range of between about 800 nm and about 1650 nm, 800 nm and about 1300 nm (e.g., about 1310 nm), or between about 800 nm and about 1100 nm, or between about 840 nm and about 1070 nm, or between about 840 nm and about 960 nm, or between about 870 nm and about 960 nm, or between about 870 nm and about 950 nm, or between about 870 nm and about 920 nm. The multimode receiver can be one that is used in VCSEL-based transceivers or it can be a specially designed multimode receiver. The multimode transmitters and/or transceivers may emit the modulated light such that the optical fiber 14 transmits the light in a multimode propagation (i.e., in two or more modes), or in two or more mode groups. In some embodiments, multimode propagation refers to propagation of at least 2 mode groups. In some embodiments, multimode propagation refers to propagation of at least 5 mode groups. In other embodiments, multimode propagation refers to propagation of at least 8 mode groups. In other embodiments, multimode propagation refers to propagation of at least 10 mode groups. In some embodiments, multimode propagation refers to propagation of at least 18 mode groups. Waveguide theory predicts that light signals will propagate down the optical fiber 14 in attenuating modes for propagation constants below some minimum values, and in discrete, relatively non-attenuating degenerate mode groups for propagating constants over that value. A mode group is a family of light rays that have the same propagation path down the core 22 such that they arrive at an opposite end of the optical fiber 14 at the same time to form a group. The optical fiber 14 may be configured to transmit light in the multimode propagation at every wavelength in the range of 800-1650 nm, or 800-1300 nm, or 800-1100 nm, for example.

Referring now to FIG. 1C, the optical fiber 14 includes a core 22 surrounded by a cladding 26. The core 22 may include an optically transparent material such as silica. The core 22 may have a diameter D of between about 14 μm and about 62.5 μm. In various embodiments, the core 22 and/or cladding 26 may be doped with one or more (e.g., two) dopants. An "up-dopant" is herein considered to be a dopant which has a propensity to raise the refractive index relative to pure undoped $SiO_2$. A "down-dopant" is herein considered to be a dopant which has a propensity to lower the refractive index relative to pure undoped $SiO_2$. An up-dopant may be present in a region of the optical fiber 14 having a negative relative refractive index when accompanied by one or more other dopants which are not up-dopants. Likewise, one or more other dopants which are not up-dopants may be present in a region of an optical fiber having a positive relative refractive index. A down-dopant may be present in a region of an optical fiber having a positive relative refractive index when accompanied by one or more other dopants which are not down-dopants. Likewise, one or more other dopants which are not down-dopants may be present in a region of an optical fiber having a negative relative refractive index. In various embodiments, the core 22 may have one or more dopants, two or more dopants, three or more dopants, or four or more dopants. The dopants may include $GeO_2$, F, $P_2O_5$ and/or $B_2O_3$. In a specific embodiment, the core 22 may include $GeO_2$ and one of F, $P_2O_5$ or $B_2O_3$. The cladding 26 may include one or more up-dopants. Exemplary up-dopants may include $GeO_2$, F, $P_2O_5$ and $Al_2O_3$.

A "refractive index profile" is the relationship between refractive index or relative refractive index and waveguide fiber radius. The "relative refractive index" is defined as $\Delta = 100 \times [n(r)^2 - n_{cl}^2)/2n(r)^2]$, where $n(r)$ is the refractive index at the radial distance r from the fiber's centerline, unless otherwise specified, and $n_{cl}$ is the average refractive index of an outer cladding region of the cladding 26 at a wavelength of 850 nm, which can be calculated, for example, by taking "N" index measurements ($n_{C1}, n_{C2}, \ldots n_{CN}$) in an outer annular region of the cladding 26, and calculating the average refractive index by the following equation:

$$n_C = (1/N) \sum_{i=1}^{i=N} n_{Ci}$$

In some embodiments, an outer cladding region includes essentially pure silica. As used herein, the relative refractive index is represented by delta or Δ and its values are typically given in units of "%," unless otherwise specified. In cases where the refractive index of a region is less than that of the average refractive index of the outer cladding region, the relative index percent is negative and is referred to as having a depressed index, or trench, and is calculated at the point at which the relative index is most negative unless otherwise specified. The terms "trench" or "moat" refer to a depressed index region in the cladding surrounding the core and can be used interchangeably herein. In cases where the refractive index of a region is greater than the refractive index of average refractive index of the outer cladding region, the relative index percent is positive and the region can be said to be raised or to have a positive index, and is calculated at the point at which the relative index is most positive, unless otherwise specified. With reference to core delta value, it is disclosed herein as maximum % delta. The cladding 26 may define a depressed region, or trench, within the refractive index profile of the optical fiber 14. It will be understood that the cladding 26 may include one or more plastic materials without departing from the teachings provided herein.

The terms "single mode propagation," "single mode operation" and "single mode transmission" refers to the propagation, operation and transmission, respectively of the fundamental mode (i.e., the LP01 mode) of the optical fibers described herein. The terms "single mode" and "single-mode" can be used interchangeably herein. The terms "multimode" and "multi-mode" can be used interchangeably herein.

The optical fiber 14 may have a refractive index profile designed to optimally operate with a "peak bandwidth" at a certain wavelength which is also referred to as "peak wavelength" or $\lambda_p$. The peak wavelength of the optical fiber 14 may be in a range of about 800 nm to about 1100 nm, or between about 840 nm and about 1070 nm, or between about 840 nm and about 960 nm, or between about 870 nm and about 960 nm, or between about 870 nm and about 920 nm. In some embodiments, the wavelength at which peak bandwidth of the optical fiber 14 occurs is between 870-960 nm. In some embodiments the wavelength at which peak bandwidth of the optical fiber 14 occurs is between 870-920 nm. For multimode propagation between 840 nm and 953 nm, the optimal peak wavelength may be between about 870 nm and about 920 nm. As used herein, the term "peak wavelength" of the optical fiber may mean a wavelength of light that maximizes a modal bandwidth of the optical fiber 14, as explained in greater detail below.

The term graded index, "α-profile" or "alpha profile," as used herein, refers to a relative refractive index profile, expressed in terms of Δ which is in units of "%," where r is the radius and which is defined by the equation below:

$$\Delta(r) = \Delta_0 \left[ 1 - \left( \frac{r}{R_1} \right)^\alpha \right],$$

where $\Delta_0$ is the relative refractive index extrapolated to r=0, $R_1$ is the radius of the core 22 (i.e. the radius at which Δ(r) is zero), and a is an exponent which is a real number. For a step index profile, the alpha value is greater than or equal to 10. For a graded index profile, the alpha value is less than 10. The term "parabolic," as used herein, includes substantially parabolically shaped refractive index profiles which may vary slightly from an a value of, for example, 2.0 at one or more points in the core 22, as well as profiles with minor variations and/or a centerline dip. The modeled refractive index profiles that exemplify the disclosure have graded index cores which are perfect alpha profiles. An actual fiber will typically have minor deviations from a perfect alpha profile, including features such as dips or spikes at the centerline and/or a diffusion tail at the outer interface of the core 22. However, accurate values of alpha and $\Delta_0$ may still be obtained by numerically fitting the measured relative refractive index profile to an alpha profile over the radius range from 0.05 $R_1 \leq r \leq 0.95$ $R_1$. In ideal graded index fibers with no imperfections such as dips or spikes at the centerline, $\Delta_0 = \Delta_{1MAX}$, where $\Delta_{1MAX}$ is the maximum refractive index of the core 22. In other cases, the value from $\Delta_0$ obtained from the numerical fit from 0.05 $R_1 \leq r \leq 0.95$ $R_1$ may be greater or less than $\Delta_{1MAX}$. The core 22 may have an alpha value of between about 1.9 and about 2.2, and more preferably, between about 1.98 and about 2.2.

The bend resistance or bend performance of the optical fiber 14 may be measured by the induced attenuation of light propagating through the fiber 14 under prescribed test conditions. As used herein, the 15 and 30 mm macrobend tests for measuring the bend performance of the optical fiber 14 consist of wrapping the fiber 2 times around a 15 and 30 mm mandrel, respectively, and calculating the induced attenuation (i.e. the increase in attenuation) caused by wrapping the fiber 14 around the mandrel. Unless otherwise specified herein, measurements of the properties of the optical fiber are taken at a wavelength $\lambda_2$, of 850 nm. According to some embodiments, the optical fiber 14 may have a bend loss at 850 nm of less than or equal to about 0.5 dB when wound two turns around a mandrel having a diameter of 15 mm, in some embodiments, less than or equal to about 0.1 dB when wound two turns around a mandrel having a diameter of 15 mm. In some embodiments, the optical fiber 14 has a bend loss at 850 nm of less than or equal to about 0.1 dB when wound two turns around a mandrel having a diameter of 30 mm. In some embodiments, the optical fiber 14 has a bend loss at 850 nm of less than or equal to about 0.05 dB when wound two turns around a mandrel having a diameter of 30 mm.

As explained above, the optical fiber 14 may be configured to transmit light in both multimode and single-mode propagations. The multimode and single-mode (i.e., LP01 mode) propagation may, and preferably does, take place in two different transmission windows. The optical fiber 14 may have different modal bandwidths depending on which type of light is being propagated (e.g., multimode or single-mode). Unless otherwise stated, the overfill (or overfilled (OFL)) bandwidth (BW) of an optical fiber is defined herein as measured using overfilled launch conditions at 850 nm according to IEC 60793-1-41 (TIA-FOTP-204), Measurement Methods and Test Procedures: Bandwidth. In the discussion below, bandwidth is understood to mean overfilled bandwidth unless otherwise indicated. The minimum calculated effective modal bandwidth (EMB) can be obtained from measured differential mode delay spectra as specified by IEC 60793-1-49 (TIA/EIA-455-220), Measurement Methods and Test Procedures: Differential Mode Delay. During multimode propagation of light, the optical fiber 14 may have a modal bandwidth of at least 2 GHz·Km, 2.5 GHz·Km, 3 GHz·Km, 5 GHz·Km, 8 GHz·Km or 10 GHz·Km at the wavelength $\lambda_1$ in a wavelength range of about 800 nm to about 1650 nm. Further, a sub-window may be defined within the wavelength range of about 800 nm to about 1300 nm, or about 840 nm to about 1200 nm, at which the optical fiber 14 has a minimum modal bandwidth at all wavelengths. The sub-window may span a wavelength range of at least 10 nm, 20 nm, 50 nm, 100 nm, 200 nm, 300 nm, or about 400 nm. The optical fiber 14 may have a modal bandwidth within the sub-window of at least 2 GHz·Km, 2.5 GHz·Km, 3 GHz·Km, 4.7 GHz·Km, 5 GHz·Km, 8 GHz·Km or 10 GHz·Km at all wavelengths within the sub-window. The optical fiber 14 may have a modal bandwidth of less than about 4 GHz·Km, 3 GHz·Km, 2.5 GHz·Km, 2 GHz·Km, 1.5 GHz·Km or 1 GHz·Km for multimode launch conditions at wavelengths greater than about 1200 nm for all wavelengths within a sub-window of at least 20 nm, 50 nm or at least 100 nm. In other embodiments, the modal bandwidth of the optical fiber 14 may be greater than 2 GHz·Km, 3 GHz·Km, 4 GHz·Km or greater than 5 GHz·Km for multimode launch conditions at wavelengths greater than about 1200 nm for all wavelengths within a sub-window of at least 20 nm, 50 nm or at least 100 nm. The modal bandwidth may be calculated according to the procedure outlined in T. A. Lenahan, "Calculation of Modes in an Optical Fiber Using the Finite Element Method and EIS-PACK," Bell Sys. Tech. J., vol. 62, pp. 2663-2695 (1983), the entire disclosure of which is hereby incorporated herein by reference.

The optical fiber 14 is structured such that a mode field diameter (MFD) of the LP01 mode and a MFD of the multimode mode are roughly equal to that of standard single-mode fibers. The LP01 mode of the optical fiber 14 has a MFD that is approximately equal to that of a G.652 compliant standard single-mode fiber such as SMF-28® optical fiber. The MFD of the single-mode transmission within the optical fiber 14 may be in the range of between about 8.5 μm and about 12.5 μm at 1310 nm. In some cases, the mode field diameter may be about 8.7-9.7 μm at 1310 nm, and about 9.8-10.8 μm at 1550 nm. The optical fiber 14 is structured to propagate light at the wavelength $\lambda_2$ in the LP01 mode and to have a MFD of the LP01 mode approximately equal (±30%, more preferably ±20%, and even more preferably ±10%) to the MFD of a single-mode fiber (e.g., at 980 nm, 1060 nm, 1310 nm, 1550 nm, etc.).

As the optical fiber 14 may be capable of transmitting light with similar MFDs in both a multimode propagation and a single-mode, or LP01, propagation (e.g., from the multimode and single-mode embodiments of the optical fiber 14), the optical fiber 14 may be referred to as "universal fiber." Because the optical fiber 14 described herein transmits optical signals at the second wavelength $\lambda_2$ in the LP01 mode, the light launched from the single-mode transmitter and/or transceiver embodiments of the transmission components 18 will propagate through the optical fiber 14, as if it was a single-mode fiber. Similarly, because the optical fiber 14 described herein transmits optical signals at the first wavelength) $\lambda_1$ in the multimode propagation, the light launched from the multimode transmitter and/or transceiver embodiments of the transmission components 18 will propagate through the optical fiber 14, as if it was a multimode fiber. The optical fiber 14, being capable of transmitting both single-mode and multimode light, may therefore be utilized in a variety of locations within the optical transmission system 10, and similar systems, as explained in greater detail below. Further, the optical fiber 14 may also be used to replace both existing single-mode and multimode fibers in an optical transmission system 10.

Figure 2A:
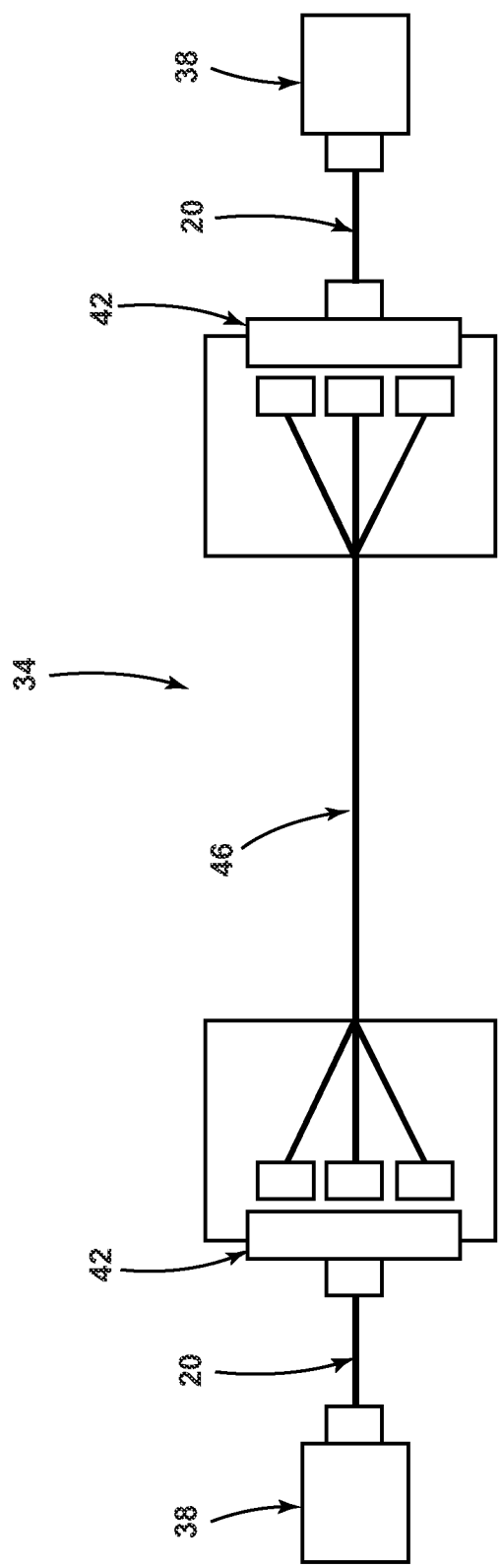
FIG. 2A is a schematic diagram of a structured cable, according to one embodiment.
Figure 2B:
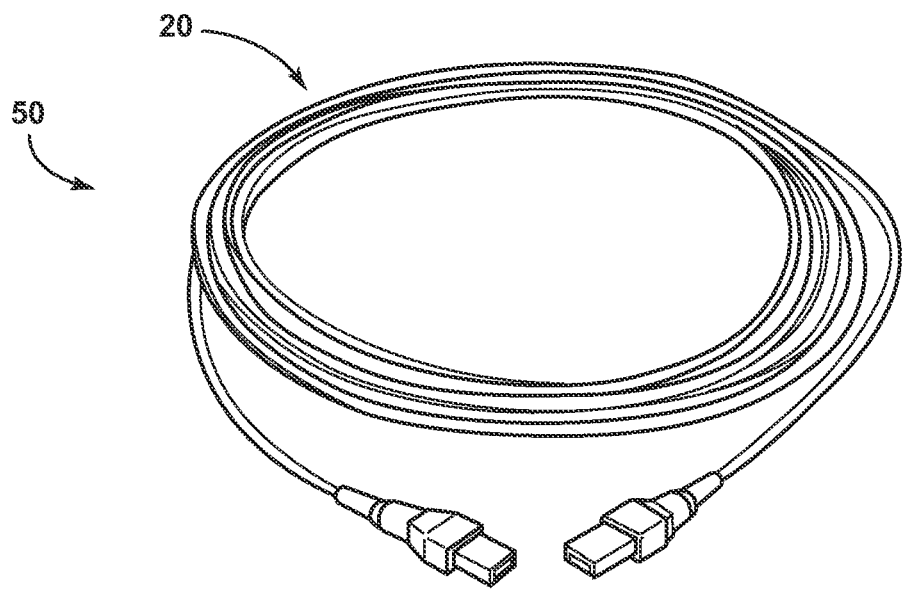
FIG. 2B is a perspective view of a jumper cable, according to one embodiment.
Figure 2C:
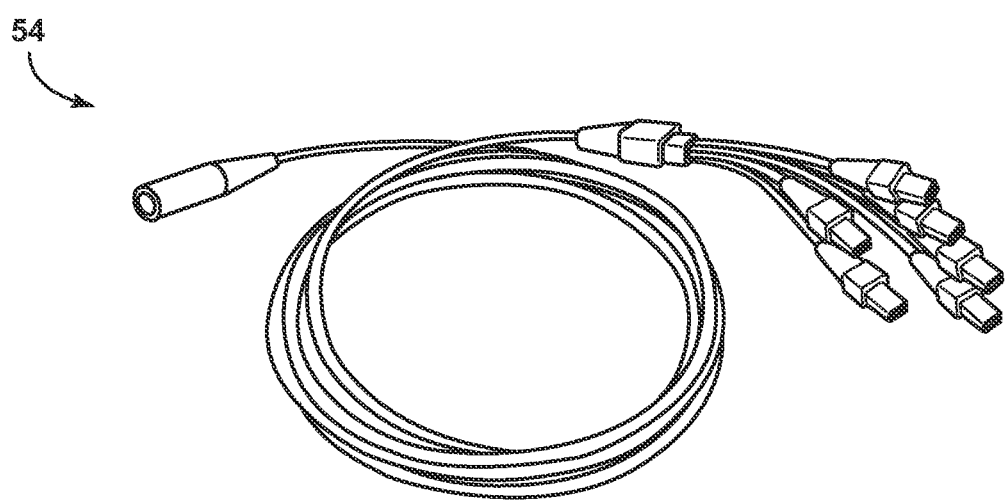
FIG. 2C is a perspective view of a harness, according to one embodiment.
Figure 2D:
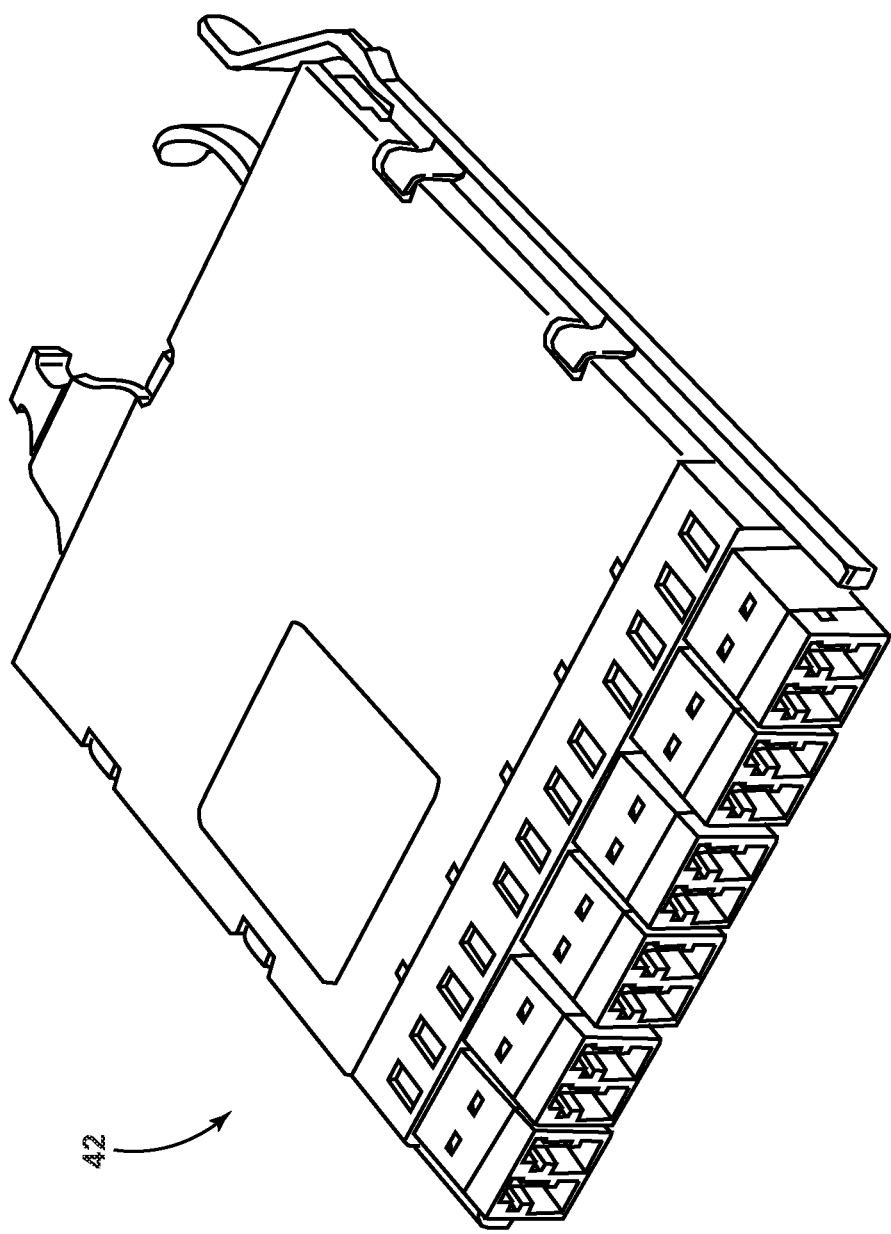
FIG. 2D is a perspective view of a module, according to one embodiment.

Referring now to FIGS. 2A-D, the optical transmission system 10 (FIGS. 1A and 1B) may be configured as a structured cable infrastructure 34. The structured cable infrastructure 34 may be utilized to facilitate optical communication between two or more electronic or other devices 38. The devices 38 are configured to transmit and/or receive optical signals in substantially the same manner as described above in connection with the transmission components 18 (FIG. 1A). The devices 38 may be electrically controlled or powered, or may be purely passive. In data center examples, the devices 38 may be a server rack, a switch rack, data storage, patch panel, a main distribution area, an optical tap module and/or other electrical or passive devices capable of receiving an optical signal. The structured cable infrastructure 34 can include the connector cables 20, modules 42 and a trunk cable 46. The devices 38 may be optically coupled with one of the modules 42 through the connector cables 20. The connector cables 20 may take a variety of forms which include a single fiber or multiple fiber connector, a jumper cable 50 (FIG. 2B) having MPO connectors and/or an MPO-to-LC harness 54 or fan-out cable with multiple LC connectors (FIG. 2C). The connector cables 20 may have a length less than or equal to about 5 m, 10 m, 15 m, 20 m, 25 m, 30 m, 40 m or 50 m. The modules 42 may include an interconnect module such as a multi-fiber termination push-on connector, for example an MPO connector to LC connector (FIG. 2D) or a connectivity hardware module that connects different cables or jumpers together. The modules 42 are optically coupled to the trunk cable 46 (e.g., through connectorization) and/or to the connector cables 20. The trunk cable 46 may have a length of greater than about 1 m, about 10 m, about 100 m, about 200 m, or greater than about 300 m.

Use of the present disclosure may offer a variety of advantages over traditional optical fibers. First, due to the "universal" nature of the optical fiber 14 to transmit both multimode and single-mode light, the optical fiber 14 may be incorporated in to the connector cables 20 and/or trunk cable 46 without regard for what type of electronic devices 38 are coupled at each end (e.g., single-mode or multimode). Such a feature may be advantageous in optically connecting the universal optical fiber 14 into existing or "legacy" systems. For example, the optical fiber 14 may be coupled to an existing single-mode transmitter and/or an existing single-mode fiber because the MFD of the fundamental mode of the universal optical fiber 14 is approximately the same as the MFD of a standard single-mode fiber. Further, at a receiving end of the optical fiber 14, either a single-mode or a multimode receiver can be coupled directly to the universal optical fiber 14. It will be understood that if mode coupling happens during propagation of light within the optical fiber 14, a standard single-mode fiber can be placed as a filter between the universal optical fiber 14 and the receiver, to strip the higher order modes. Similarly, because the universal optical fibers 14 in the embodiments of the optical transmission systems 10 disclosed herein are capable of operating at both a wavelength range of about 800 nm to about 1200 nm for multimode transmission and at a longer wavelength $\lambda_2$ (i.e. $\lambda_2 > \lambda_1$, where $\lambda_2 - \lambda_1 \geq 100$ nm) for single-mode transmission, they can be used with a commonly utilized 850 nm VCSELs, and at a later time the optical transmission system 10 can be advantageously upgraded by replacing 850 nm VCSEL with a longer wavelength (e.g. $\lambda_2 > 950$ nm) light source, without replacing the universal optical fiber(s) 14 that is(are) already laid down. It will be understood that the universal optical fiber 14 may also be coupled to legacy multimode fibers (e.g., OM2, OM3 or OM4 multimode fiber) with similar benefits achieved therefrom.

Second, the universal optical fiber 14 can be used in the optical transmission system 10 for transmission of signals provided by VCSEL light source(s) (e.g., in a wavelength range of between about 800 nm and about 1650 nm), light emitting diode sources, and for the single-mode transmission of signal light provided to it from a single-mode fiber, and the optical transmission system 10 advantageously may not require coupling devices utilizing mode converting lenses between the single-mode fiber and the multimode fiber. For example, a single-mode fiber and the universal optical fiber 14 can be advantageously spliced to one another, or butt coupled to one another, without necessarily needing to have an intervening lens element therebetween. Further, low coupling loss (i.e., insertion loss) between a conventional multimode fiber (e.g., the connector cables 20 having a core of about 50 μm) to the universal fiber 14 may be less than or equal to about 3.0 dB, 2.5 dB, 2.0 dB, 2.0 dB, 1.5 dB, 1.0 dB or less than about 1.0 dB. Further, low coupling loss (i.e., insertion loss) between a conventional single-mode fiber (e.g., SMF having a mode filed diameter at 1310 nm of 8.5 to 9.5 microns) and the universal fiber 14 may be less than or equal to about 2.0 dB, ≤1.5 dB, ≤1.0 dB, ≤0.5 dB, or less than about 0.3 dB.

EXAMPLES

Figure 3:
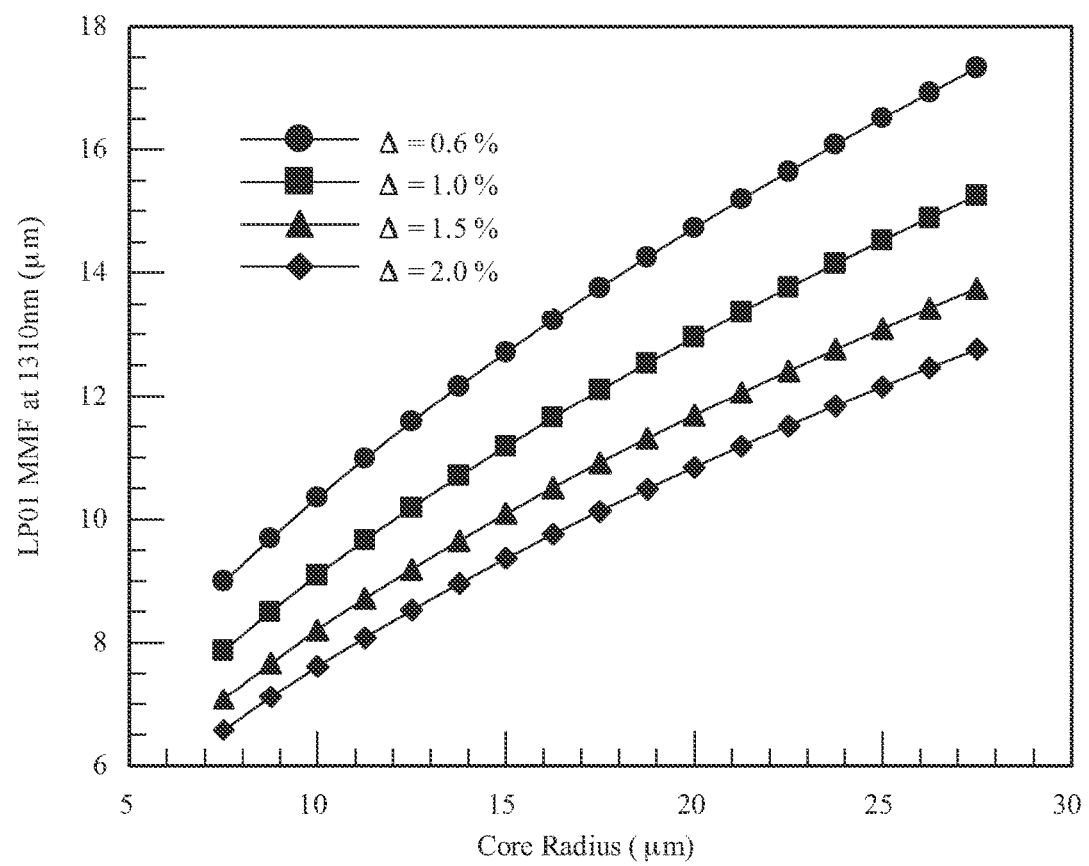
FIG. 3 illustrates a mode field diameter of an LP01 mode at a 1310 nm wavelength vs. fiber core radii of several exemplary optical fiber embodiments.

FIG. 3 illustrates modeled LP01 mode MFD of optical fibers 14 (FIG. 1A) with several exemplary core deltas versus core radii, at second wavelength $\lambda_2$=1310 nm. For the purpose of the model shown in FIG. 3 the core alpha of optical fibers 14 are 2.1 but the calculated LP01 mode MFD vary very little for a range of alpha between 1.9 and 2.2, over the range of core radii illustrated in FIG. 3. FIG. 3 illustrates that in order for the MFD of the optical fiber 14 to match the MFD of a G.652 compliant optical fiber such as SMF-28® or SMF-28® Ultra optical fiber at wavelength $\lambda_2$=1310 nm (e.g., ±20%), the radius of the core 22 (FIG. 1C) of the optical fiber 14 with 1% delta should be around 10 μm (core diameter D should be around 20 μm). For example, for an optical fiber 14 with a relative refractive core index delta of Δ=0.6%, the fiber 14 should preferably have a core diameter D of about 15 μm, in order to have an LP01 mode MFD that is approximately equal to the MFD of a G.652 compliant optical fiber such as SMF-28® or SMF-28® Ultra optical fiber. FIG. 3 also indicates that when the core delta of the optical fiber 14 is decreased, the core radius of the optical fiber 14 should be decreased in order for the LP01 mode MFD of the optical fiber 14 to approximately equal the mode field diameter of a G.652 compliant optical fiber such as SMF-28® or SMF-28® Ultra optical fiber at 1310 nm (i.e., between about 8.5 and 12.5 μm at a wavelength of 1310 μm to enable the optical fiber 14 to exhibit an MFD of within ±30% of the MFD of a G.652 compliant optical fiber such as SMF-28®, SMF-28® Ultra optical fiber or a G65× optical fiber). However, if an optical fiber 14 with a core delta of 2.0% is selected, the core diameter D should be around 30 μm. Thus, FIG. 3 indicates that when the core delta of the optical fiber 14 is increased, the core radius of the optical fiber 14 should be increased. FIG. 3 illustrates that for any given core delta value of the optical fiber 14 chosen, a proper core diameter D may be chosen so that the mode field diameter of the optical fiber 14 is approximately (±30%) equal the mode field diameter of the single-mode fiber (i.e., in this example MFD of a G.652 compliant optical fiber such as of SMF-28® fiber or SMF-28® Ultra optical). A similar study can be done for single-mode operation at a wavelength around 1550 nm, or for any other wavelength of interest.

In practice, performance at both single mode operation at a wavelength of 1310 nm and multi-mode operation around an 850 nm wavelength can be considered. It has been discovered that the LP01 MFD of a multi-mode optical fiber at 1300 nm exhibits low insertion loss to standard single-mode fibers. For multimode operation of the disclosed universal optical fiber, a large core and high delta are preferred for reducing coupling loss from a VCSEL and/or from a standard multimode fiber with delta of 1% and core diameter of 50 μm. For example, for a delta of 1% and core diameter of 20 μm, the coupling loss at 850 nm from a 50 μm standard multi-mode fiber is about 5.1 dB, and the coupling from the disclosed universal fiber having a 1% delta and 20 μm diameter core to a 1% delta and core diameter of 50 μm multi-mode fiber is <0.2 dB. The MFD of the universal fiber having a 1% delta and 20 μm diameter core at 1310 nm is about 9.1 μm, nearly perfectly matching the 9.2 μm MFD at 1310 nm of the standard single mode fiber resulting in an insertion loss between these two fibers of nearly zero dB. If the core diameter of the 1% delta universal fiber is increased to 26 μm, the coupling loss from a 50 μm standard multimode fiber is reduced to 3.8 dB at 850 nm and the coupling from the universal fiber having a 1% delta and 20 μm diameter core to a 1% delta and core diameter of 50 μm multi-mode fiber is <0.2 dB. The corresponding MFD at 1310 nm is 10.4 μm, resulting in an insertion loss between these two fibers of about 0.07 dB which is still very low for 1310 single mode operation. The core delta can be increased to reduce the coupling loss further. For example, if the universal fiber has a core delta of 1.2% and core diameter of 31 μm is chosen, the coupling loss at 850 nm from a 1% delta 50 μm core diameter multi-mode optical fiber is reduced to 2.5 dB and the coupling from a the universal fiber having a 1% delta and 20 μm diameter core to a 1% delta and core diameter of 50 μm multi-mode fiber is <0.2 dB. The corresponding MFD at 1310 nm is 10.9 μm, resulting in an insertion loss between these two fibers of about 0.13 dB. which is still very low for 1310 single mode operation. If the core delta of the universal fiber is increased to 2% and core diameter is increased to 35 μm, the coupling loss at 850 nm from a 1% delta 50 μm core diameter multi-mode optical fiber is only 0.6 dB and the coupling from a the universal fiber having a 1% delta and 20 μm diameter core to a 1% delta and core diameter of 50 μm multi-mode fiber is <0.2 dB. The corresponding MFD at 1310 nm is 10.9 μm, resulting in an insertion loss between these two fibers of about 0.06 dB, which is very low for 1310 single mode operation. From the examples disclosed herein, it is preferable the core has a delta, delta $1_{max}$, where 1%≤delta $1_{max}$≤2% in some embodiments and 1.2%≤delta $1_{max}$≤2% in other embodiments. In some embodiments, the core diameter is between 20 μm and 40 μm and in some other embodiments, the core diameter is between 30-40 μm. In some embodiments, the LP01 MFD at 1310 nm can be in the range from 8.5-12.5 μm in some preferred embodiments. In some embodiments the LP01 MFD at 1310 nm can be in the range from 9-12 μm.

Figure 4:
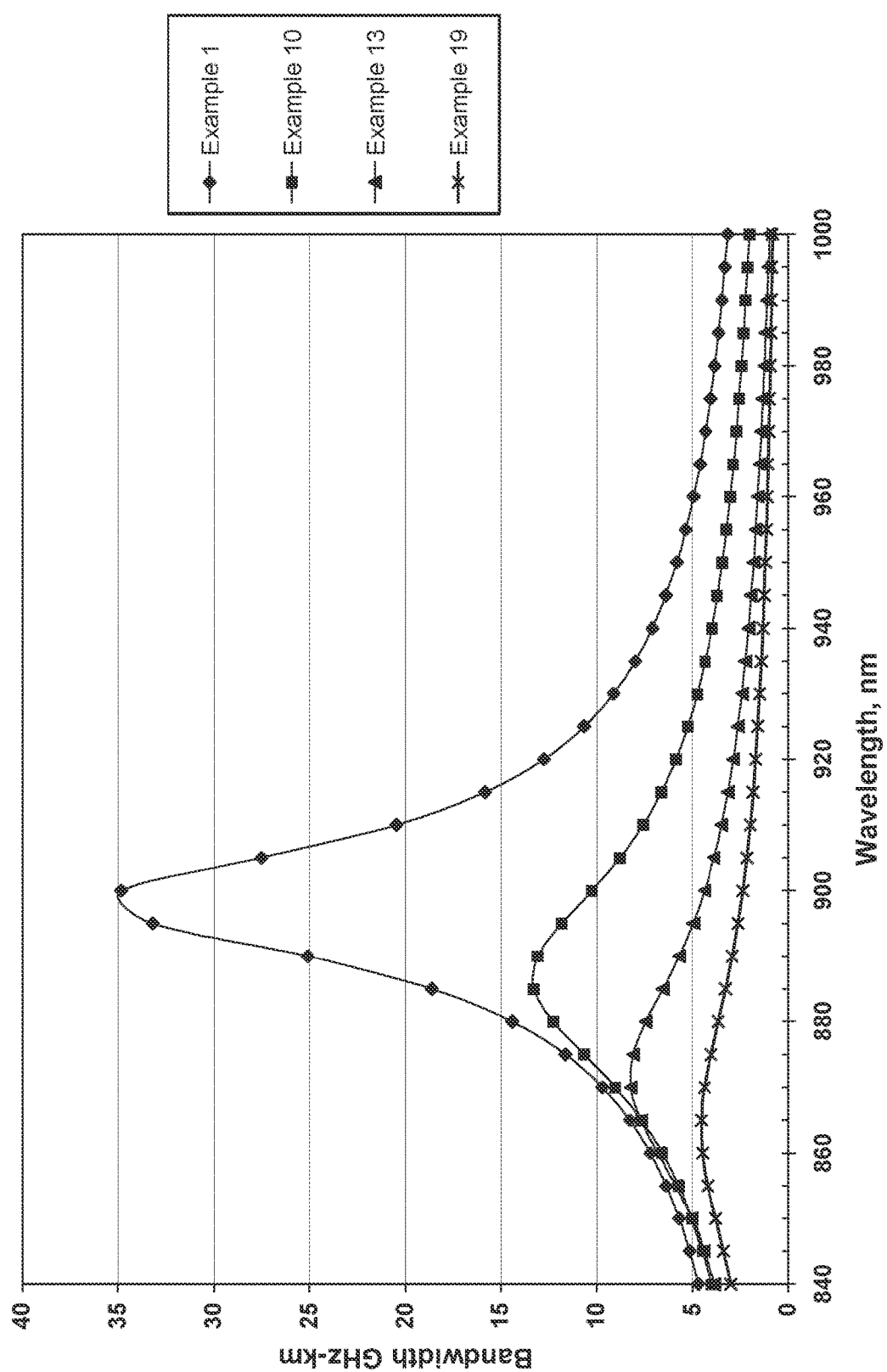
FIG. 4 illustrates bandwidth vs. wavelength for several exemplary optical fibers.
Figure 5A:
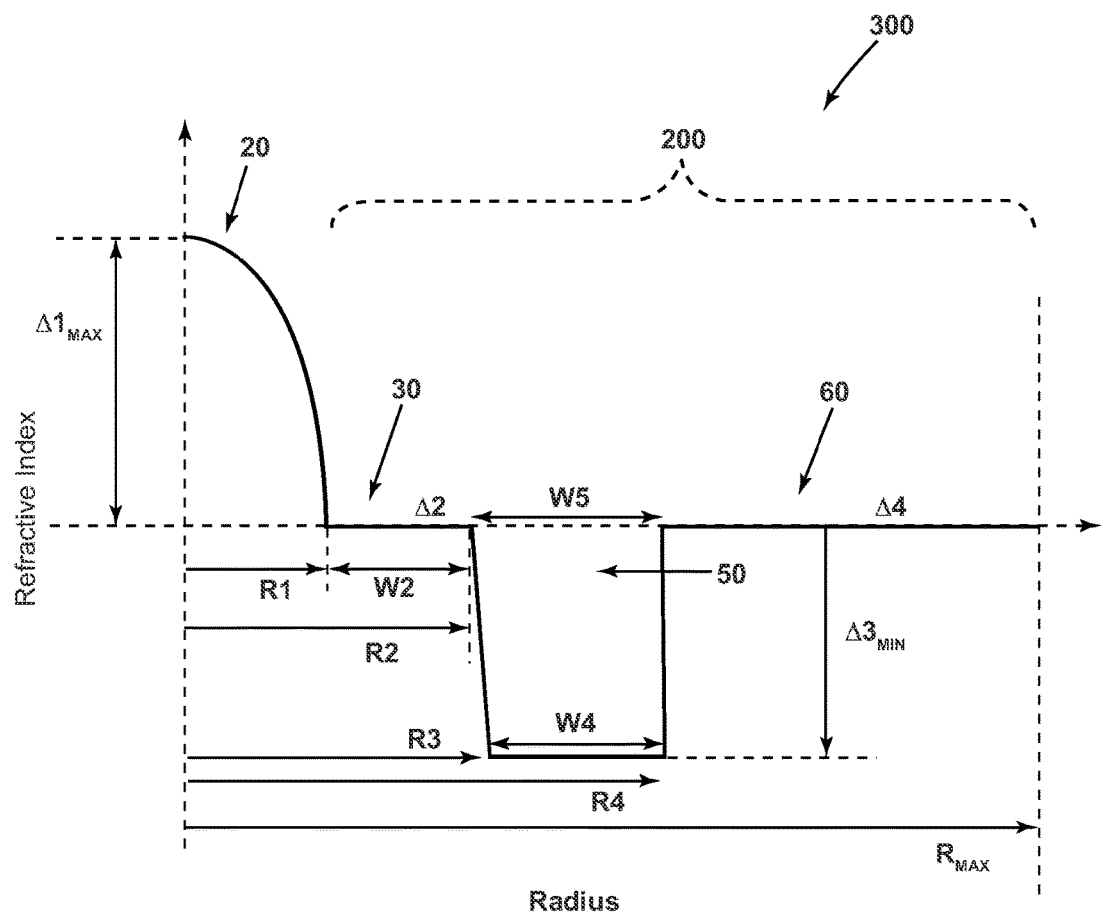
FIG. 5A illustrates a refractive index profile of an optical fiber, according to one embodiment.

Referring now to FIGS. 4-8, depicted are graphs of the bandwidth vs. wavelength and delta vs. fiber radius for several exemplary optical fibers 14, each with the refractive index profile schematically depicted in FIG. 5A. FIG. 4 depicts several exemplary core deltas and their associated bandwidth vs. wavelength profiles (i.e., examples from Table 2). Table 1 shows exemplary parameters of examples of the optical fibers 14 where multimode operation of the optical fiber 14 can be optimized at different wavelength windows while single-mode operation may be performed between about 1200 nm and about 1600 nm. All embodiments of the optical fiber 14 shown in Table 1 have MFDs in the range of 9.1 μm to 9.3 μm, which is within 30% of the mode field diameters of G.652 compliant standard single-mode fibers such as SMF-28® optical fiber or SMF-28® Ultra optical fiber, which has a mode field diameter of 9.2 μm at 1310 nm.

Table 1 shows modeled examples for a silica fiber having a GeO$_2$ doped core universal fiber (Fibers 1-4), core delta $1_{max}$, core radius, core alpha, trench (moat) delta and inner and outer radii, and having an outer radius is 62.5 μm.

TABLE 1

| Parameter | Fiber 1 | Fiber 2 | Fiber 3 | Fiber 4 |
| --- | --- | --- | --- | --- |
| Core Delta $1_{max}$ (%) | 1.0 | 1.0 | 1.2 | 1 |
| Core Radius (μm) | 11.5 | 14.0 | 11.5 | 13.5 |
| Core Alpha | 2.085 | 2.043 | 2.005 | 1.997 |
| Trench Delta (%) | −0.4 | −0.4 | −0.4 | 0 |
| Trench R1 (μm) | 12.6 | 14.8 | 12.3 | n/a |
| Trench R2 (μm) | 17.6 | 19.8 | 17.3 | n/a |

All embodiments of the optical fiber 14 shown in Table 1 have bend loss at 850 nm, 2 turns/15 mm and 2 turns/30 mm mandrel in the range of ≤0.5 dB and 0.1 dB, respectively and optical fibers 1, 2 and 3 have a bend loss at 850 nm, 2 turns/15 mm and 2 turns/30 mm mandrel in the range of ≤0.1 dB and 0.05 dB, respectively. It will be understood that all fibers disclosed in Table 1 are capable of both single mode operation at wavelengths >1200 nm and multimode transmission at wavelengths between 800-1100 nm.

Figure 5B:
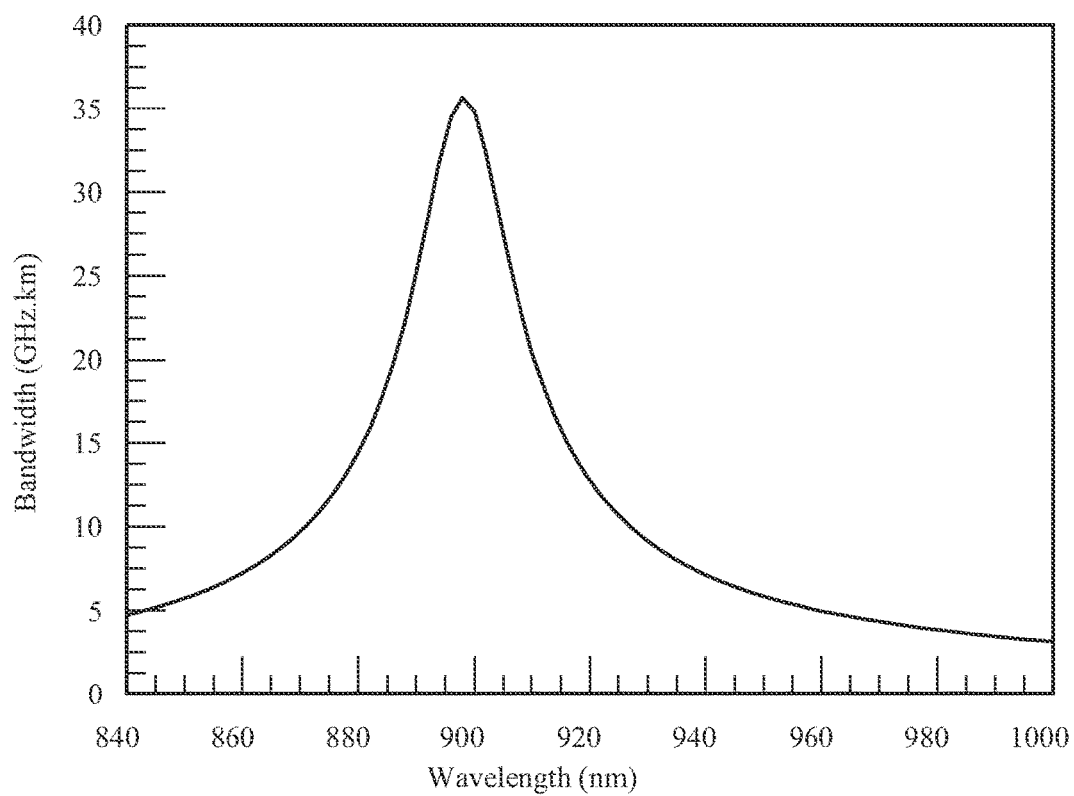
FIG. 5B illustrates bandwidth vs. wavelength for the optical fiber of FIG. 5A.

Referring now to FIGS. 5A and 5B, depicted is a refractive index profile (FIG. 5A) and a graph of the modal bandwidth (FIG. 5B) for the Fiber 1 example of the optical fiber 14 shown in Table 1. FIG. 5A is a schematic representation of glass optical fibers (e.g., the optical fiber 14) described herein. The optical fiber 14 includes the core 22, having a maximum index, $\Delta 1_{MAX}$ and an outer radius R1, an inner cladding 26A having an index Δ2, an outer radius R2 and a width, W2=R2−R1. A trench 70 has an index $\Delta 3_{MIN}$, a minimum radius R3, an outer radius R4, a maximum width W5 of W5=R4−R2, and minimum width W4 of W4=R4−R3. An outer cladding 26B has an index Δ4 and a radius Rmax. A primary and a secondary polymer coating surrounding optical fiber 14 may also be utilized. The optical fiber 14 may have a peak wavelength at about a 900 nm wavelength. The optical fiber 14 may have a bandwidth of at least about 1 GHz·Km, 1.5 GHz·Km, 2.0 GHz·Km, 2.5 GHz·Km, 3.0 GHz·Km, 3.5 GHz·Km, 4.0 GHz·Km, 4.5 GHz·Km, or 5 GHz·Km over a sub-window wavelength band of about 100 nm within a wavelength range of between about 800 nm and about 1100 nm.

Figure 6:
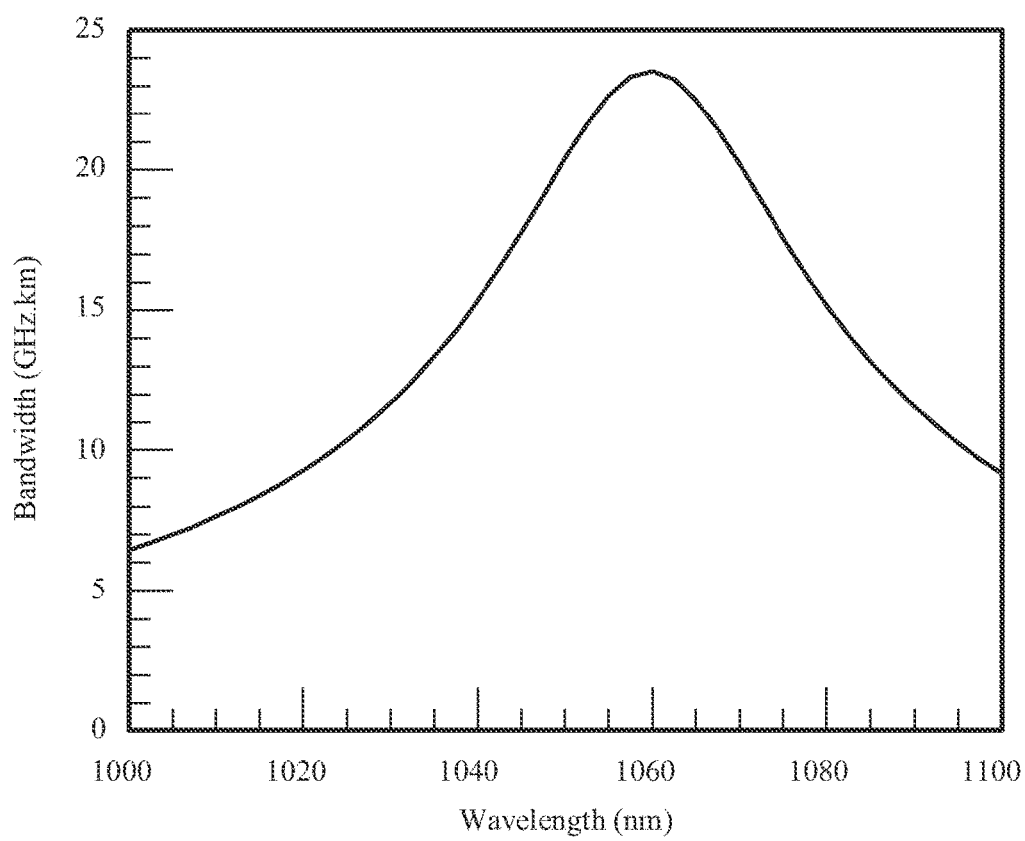
FIG. 6 illustrates bandwidth vs. wavelength for an exemplary optical fiber, according to another embodiment.

Referring now to FIG. 6, depicted is a bandwidth vs. wavelength chart for the Fiber 2 example of the optical fiber 14. The Fiber 2 example of the optical fiber 14 may have a peak wavelength at about a 1060 nm wavelength. The optical fiber 14 may have a bandwidth of at least about 1 GHz·Km, 1.5 GHz·Km, 2.0 GHz·Km, 2.5 GHz·Km, 3.0 GHz·Km, 3.5 GHz·Km, 4.0 GHz·Km, 4.5 GHz·Km, 5 GHz·Km or 5.5 GHz·Km over a sub-window wavelength band of about 100 nm within a wavelength range of between about 800 nm and about 1100 nm.

Figure 7:
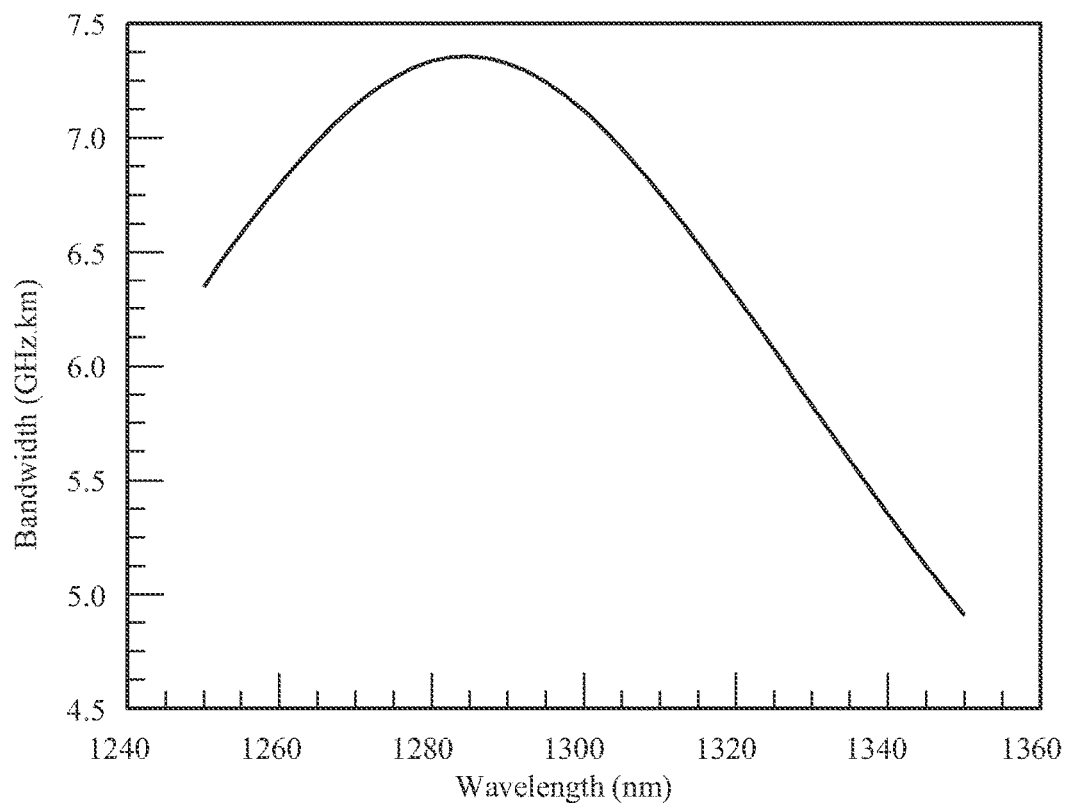
FIG. 7 illustrates bandwidth vs. wavelength for an exemplary optical fiber, according to another embodiment.

Referring now to FIG. 7, depicted is a bandwidth vs. wavelength chart for the Fiber 3 example of the optical fiber 14. The Fiber 3 example of the optical fiber 14 may have a peak wavelength at about a 1060 nm wavelength. The optical fiber 14 may have a bandwidth of at least about 1 GHz·Km, 1.5 GHz·Km, 2.0 GHz·Km, 2.5 GHz·Km, 3.0 GHz·Km, 3.5 GHz·Km, 4.0 GHz·Km, 4.5 GHz·Km or 5 GHz·Km over a sub-window wavelength band of about 100 nm within a wavelength range of between about 800 nm and about 1100 nm.

Figure 8:
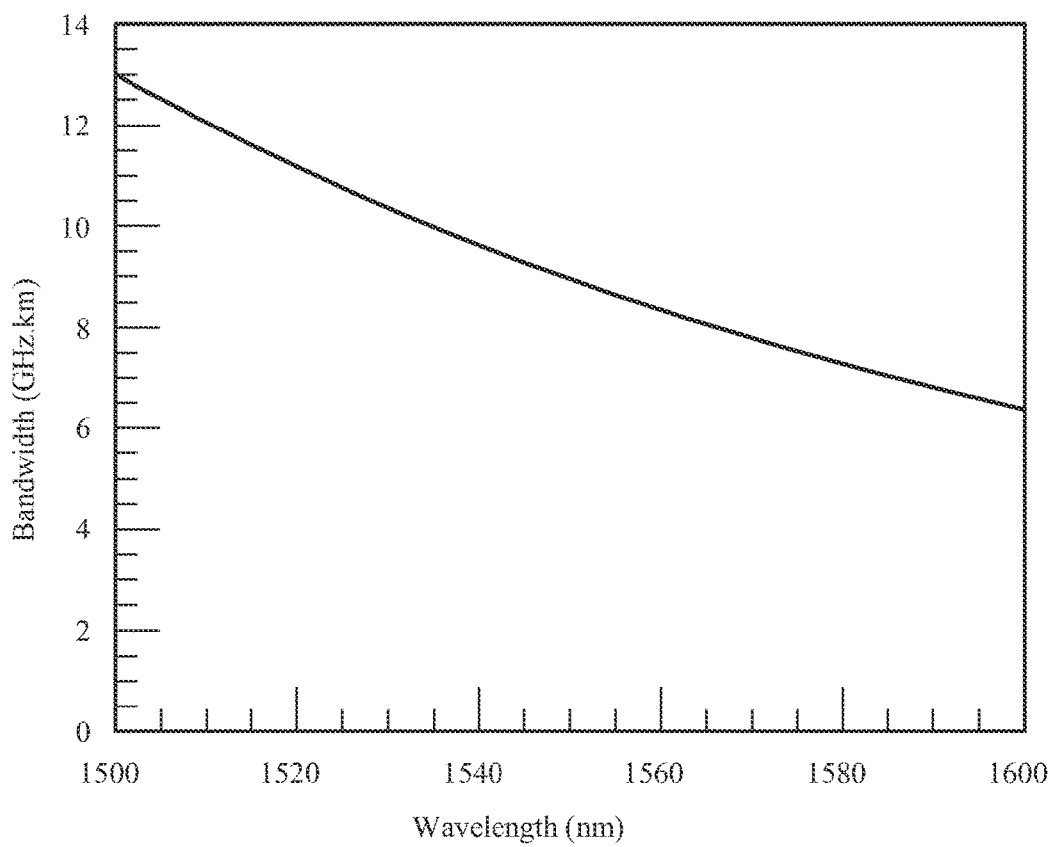
FIG. 8 illustrates bandwidth vs. wavelength for an exemplary optical fiber, according to another embodiment.

Referring now to FIG. 8, depicted is a bandwidth vs. wavelength chart for the Fiber 4 example of the optical fiber 14. The Fiber 4 example of the optical fiber 14 may have a peak wavelength at about a 1060 nm wavelength. The optical fiber 14 may have a bandwidth of at least about 1 GHz·Km, 1.5 GHz·Km, 2.0 GHz·Km, 2.5 GHz·Km, 3.0 GHz·Km, 3.5 GHz·Km, 4.0 GHz·Km, 4.5 GHz·Km, 5 GHz·Km or 5.5 GHz·Km over a sub-window wavelength band of about 100 nm within a wavelength range of between about 800 nm and about 1100 nm.

Table 2 shows modeled insertion losses for examples of a universal fiber (examples 5-19) in which the core delta $1_{max}$, core numerical aperture and core diameter are varied. These examples include silica fibers including a $GeO_2$ doped core, a fluorine doped trench having a starting radius spaced about 1 to 1.5 microns from the core edge, a $\Delta_{3\ min}$ of about −0.4% and a trench volume of about −90%Δ·μm².

TABLE 2

| Example | Core Delta $1_{max}$, % | Core numerical aperture | Core diameter, μm | Multimode insertion loss at 850 nm from standard MMF 50 μm, 0.2 NA core, to the Universal fiber (dB) | LP01 mode MFD of the Universal fiber at 1310 nm (μm) |
|---|---|---|---|---|---|
| 5 | 1 | 0.205 | 23 | 4.4 | 9.8 |
| 6 | 1 | 0.205 | 20 | 5.1 | 9.1 |
| 7 | 1 | 0.205 | 26 | 3.8 | 10.4 |
| 8 | 1 | 0.205 | 30 | 3.1 | 11.2 |
| 9 | 1.2 | 0.225 | 31 | 2.5 | 10.9 |
| 10 | 1.2 | 0.225 | 25 | 3.5 | 9.8 |
| 11 | 1.2 | 0.225 | 33 | 2.2 | 11.3 |
| 12 | 1.2 | 0.225 | 38 | 1.5 | 12.1 |
| 13 | 1.5 | 0.251 | 27 | 2.6 | 9.7 |
| 14 | 1.5 | 0.251 | 31 | 1.9 | 10.3 |
| 15 | 1.5 | 0.251 | 35 | 1.3 | 11.0 |
| 16 | 2 | 0.290 | 35 | 0.6 | 10.3 |
| 17 | 2 | 0.290 | 30 | 1.4 | 9.5 |
| 18 | 2 | 0.290 | 33 | 0.9 | 9.9 |
| 19 | 2 | 0.290 | 25 | 2.4 | 8.5 |

| Example | Insertion loss at 1310 nm from SMF having a 9.2 μm MFD (at 1310 nm) to the LP01 mode of the Universal fiber (dB) | Multimode insertion loss at 850 nm from the Universal fiber to standard MMF 50 μm 0.2 NA core (dB) | Insertion loss at 1310 nm of the LP01 mode from the Universal fiber to SMF having a 9.2 μm MFD (at 1310 nm) (dB) |
|---|---|---|---|
| 5 | 0.02 | <0.2 | 0.02 |
| 6 | 0.00 | <0.2 | 0.00 |
| 7 | 0.07 | <0.2 | 0.07 |
| 8 | 0.17 | <0.2 | 0.17 |
| 9 | 0.13 | <0.2 | 0.13 |
| 10 | 0.02 | <0.2 | 0.02 |
| 11 | 0.18 | <0.2 | 0.18 |
| 12 | 0.32 | <0.2 | 0.32 |
| 13 | 0.01 | <0.2 | 0.01 |
| 14 | 0.06 | <0.2 | 0.06 |
| 15 | 0.14 | <0.2 | 0.14 |
| 16 | 0.06 | <0.2 | 0.06 |
| 17 | 0.00 | <0.2 | 0.00 |
| 18 | 0.03 | <0.2 | 0.03 |
| 19 | 0.03 | <0.2 | 0.03 |

| Example | Universal fiber bandwidth at 850 nm (GHz · km) | Universal fiber bandwidth at 950 nm (GHz · km) |
|---|---|---|
| 5 | >5 | >5 |
| 6 | >5 | >5 |
| 7 | >5 | >5 |

TABLE 2-continued

| | | |
|---|---|---|
| 8 | >5 | >5 |
| 9 | >4.7 | >3.8 |
| 10 | >4.7 | >3.8 |
| 11 | >4.7 | >3.8 |
| 12 | >4.7 | >3.8 |
| 13 | >4.7 | >2 |
| 14 | >4.7 | >2 |
| 15 | >4.7 | >2 |
| 16 | >3 | >1 |
| 17 | >3 | >1 |
| 18 | >3 | >1 |
| 19 | >3 | >1 |

The results in Table 2 show multimode insertion loss at 850 nm from standard MMF having a 50 μm core with a 0.2 numerical aperture to the universal fiber can be low and is between 0.6 to 5.1 dB. Additionally, the data in Table 2 shows the MFD of the LP01 mode of the universal fiber at 1310 nm is between 9.1 to 12.1 μm. Further, the data in Table 2 shows the insertion loss at 1310 nm from SMF having a 9.2 μm MFD (at 1310 nm) to the fundamental mode of the universal fiber is very low and between 0.00 and 0.32 dB, also the multimode insertion loss at 850 nm from the universal fiber to standard MMF having a 50 μm core with a 0.2 numerical aperture is very low and <0.2 dB. The insertion loss at 1310 nm of the fundamental mode from the universal fiber to SMF having a 9.2 μm MFD (at 1310 nm) is very low and between 0.00 and 0.32 dB. The universal fiber bandwidth at 850 nm and 950 nm is >5 GHz·km in examples 5-8. The universal fiber bandwidth at 850 nm and 950 nm is >4.7 and 3.8 GHz·km, respectively, in examples 9-12. The universal fiber bandwidth at 850 nm and 950 nm is >4.7 and 2 GHz·km, respectively, in examples 13-15. The universal fiber bandwidth at 850 nm and 950 nm is >3 and 1 GHz·km, respectively, in examples 16-18.

Table 3 shows modeled silica fibers (e.g., universal fibers) having dual dopants $GeO_2$ and $P_2O_5$ in the core.

TABLE 3

| Example | Core, delta $1_{max}$, % | $GeO_2$ Concentration max, mole % | $P_2O_5$ Concentration max, mole % | alpha$_1$_GeO$_2$ at 850 nm | alpha$_2$_P$_2$O$_5$ at 850 nm |
|---|---|---|---|---|---|
| 20 | 1 | 4.42 | 4.41 | 2.31 | 2.31 |
| 21 | 1.2 | 5.30 | 5.29 | 2.31 | 2.31 |
| 22 | 1.5 | 6.63 | 6.62 | 2.31 | 2.31 |
| 23 | 2 | 8.84 | 8.82 | 2.31 | 2.31 |

| Example | Core radius, $R_1$, μm | R2, μm | Delta-2, % | R3, μm | Delta-3 min, % | R4, μm | Delta-4, % |
|---|---|---|---|---|---|---|---|
| 20 | 11.5 | 12.5 | 0.0 | 18.5 | −0.45 | 62.5 | 0.0 |
| 21 | 12.5 | 13.5 | 0.0 | 19.5 | −0.45 | 62.5 | 0.0 |
| 22 | 15.5 | 16.5 | 0.0 | 21.5 | −0.45 | 62.5 | 0.0 |
| 23 | 17.5 | 18.5 | 0.0 | 23.5 | −0.45 | 62.5 | 0.0 |

| Example | Trench Volume ($V_{Trench}$), %·μm$^2$ | Bandwidth at 850 nm, GHz·km | Bandwidth at 950 nm, GHz·km | Bending loss at 850 nm 2 turns on 15 mm dia. Mandrel, dB |
|---|---|---|---|---|
| 20 | −83.7 | >5 | >5 | <0.2 |
| 21 | −89.1 | >4.7 | >4.7 | <0.2 |
| 22 | −85.5 | >4.7 | >4.7 | <0.2 |
| 23 | −94.5 | >3 | >3 | <0.2 |

The results in Table 3 show that the examples of the universal fibers have bandwidths at 850 and 950 nm of >3 GHz·km and in some examples >5 GHz·km. These fibers also show excellent bending loss performance at 850 nm of <0.2 dB for two turns around a 15 mm diameter mandrel.

Table 4 shows modeled silica fibers having dual dopants $GeO_2$ and F in the core.

TABLE 4

| Example | Core, delta-$1_{max}$, % | $GeO_2$ Concentration max, mole % | F Concentration max, mole % | alpha$_1$ at 850 nm | alpha$_2$ at 850 nm |
|---|---|---|---|---|---|
| 24 | 1 | 4.5 | 2 | 2.055 | 2.052 |
| 25 | 1.2 | 5.4 | 2.4 | 2.055 | 2.052 |
| 26 | 1.5 | 6.8 | 3.0 | 2.055 | 2.052 |
| 27 | 2.0 | 9.0 | 4.0 | 2.055 | 2.052 |

| Example | R1, μm | R2, μm | Delta-2, % | R3, μm | Delta-3 Min, % | R4, μm | Delta-4, % |
|---|---|---|---|---|---|---|---|
| 24 | 12.5 | 13.5 | 0.0 | 19.0 | −0.45 | 62.5 | 0.0 |
| 25 | 13.5 | 14.5 | 0.0 | 20.0 | −0.45 | 62.5 | 0.0 |
| 26 | 16.5 | 17.5 | 0.0 | 22.5 | −0.45 | 62.5 | 0.0 |
| 27 | 18.5 | 19.5 | 0.0 | 24.0 | −0.45 | 62.5 | 0.0 |

| Example | Trench Volume (Vtrench), %·μm$^2$ | Bandwidth at 850 nm, GHz·km | Bandwidth at 950 nm, GHz·km | Bending loss at 850 nm 2 turns on 15 mm dia. Mandrel, dB |
|---|---|---|---|---|
| 24 | −80.4 | >5 | >5 | <0.2 |
| 25 | −85.4 | >4.7 | >4.7 | <0.2 |
| 26 | −90.0 | >4.7 | >4.7 | <0.2 |
| 27 | −88.1 | >3 | >3 | <0.2 |

The results in Table 4 show these examples of the universal fibers have bandwidth at 850 and 950 nm of >3 GHz·km and in some embodiments >5 GHz·km. These fibers also show excellent bending loss performance at 850 nm of <0.2 dB for two turns around a 15 mm diameter mandrel. Further, for the fibers shown in Tables 3 and 4, the modeled insertion loss at 1310 nm from SMF having a 9.2 μm MFD (at 1310 nm) to the fundamental mode of the universal fiber is very low and between 0.00 and 0.32 dB, that is, similar to optical fibers having the same core delta maximum and radius in Table 2. Also the modeled multimode insertion loss at 850 nm from the universal fibers shown in Tables 3 and 4 to standard MMF having a 50 μm core with a 0.2 numerical aperture is very low and <0.2 dB. The modeled insertion loss at 1310 nm of the fundamental mode from the universal fibers shown in Tables 3 and 4 to SMF having a 9.2 μm MFD (at 1310 nm) is very low and between 0.00 and 0.32 dB.

Modifications of the disclosure will occur to those skilled in the art and to those who make or use the disclosure.

Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. An optical fiber comprising: a core comprised of silica with a core diameter and comprising at least two dopants, a maximum relative refractive index delta of at least 0.7% and an alpha value in the range of 1.9-2.2, the core having a refractive index profile configured to transmit light in a multimode propagation at every wavelength $\lambda_1$ in the range of 800-1650 nm, the optical fiber being structured to exhibit a modal bandwidth of at least 2 GHz·Km within the wavelength $\lambda_1$ in the range of 800-1650 nm and to have a LP01 mode field diameter in the range of 8.5-12.5 µm at a wavelength of 1310 nm.

2. The optical fiber of claim 1, wherein said multimode propagation comprises propagation of at least 5 mode groups at a first wavelength $\lambda_1$ in the range of 800-1100 nm.

3. The optical fiber of claim 2, wherein the optical fiber is configured to exhibit a modal bandwidth of at least 2 GHz·Km for all wavelengths within a sub-window of at least 20 nm within the wavelength $\lambda_1$ in the range of 800-1650 nm.

4. The optical fiber of claim 2, wherein the optical fiber has a peak multimode bandwidth at a wavelength between 870-960 nm.

5. The optical fiber of claim 4, wherein the optical fiber has a peak multimode bandwidth at a wavelength between 870-920 nm.

6. The optical fiber of claim 1, wherein the at least two dopants comprise $GeO_2$ and one of F, $P_2O_5$ or $B_2O_3$.

7. The optical fiber of claim 5, wherein the alpha value of the core is in the range of 1.98-2.2.

8. The optical fiber of claim 5, wherein the fiber includes a cladding comprising silica surrounding the core, the cladding comprising depressed index region relative to an outer cladding.

9. The optical fiber of claim 2, wherein the optical fiber has a modal bandwidth of at least 2.5 GHz·Km at the first wavelength $\lambda_1$.

10. The optical fiber of claim 9, wherein the optical fiber has a modal bandwidth of at least 3.0 GHz·Km at the first wavelength $\lambda_1$.

11. An optical fiber comprising: a core having a core diameter, a maximum relative refractive index delta of at least 0.7% and an alpha value in the range of 1.9-2.2, and a refractive index profile designed to be multimoded at every wavelength $\lambda_1$ in the range of 800-1650 nm and to transmit light in a multimode propagation at greater than 2 GHz·km modal bandwidth at all wavelengths within a sub-window of at least 100 nm between a wavelength range of 800-1200 nm and to propagate light in a LP01 mode at another wavelength $\lambda_2$, wherein the wavelength $\lambda_2$ is greater than 1200 nm, the optical fiber being structured to have a LP01 mode field diameter in the range of 8.5-12.5 µm at 1310 nm.

12. The optical fiber of claim 11, wherein the core is configured to transmit light in a multimode propagation at greater than 3 GHz·km at all wavelengths within a sub-window of at least 100 nm between a wavelength range of 800-1200 nm and the optical fiber has a peak bandwidth at a wavelength between 870-960 nm.

13. The optical fiber of claim 11, wherein the wavelength $\lambda_2$ is greater than 1250 nm and the optical fiber has a peak bandwidth at a wavelength between 870-920 nm.

14. The optical fiber of claim 13, wherein the sub-window is in a wavelength range of 840-1100 nm.

15. The optical fiber of claim 11, wherein the wavelength $\lambda_2$ is situated in a 1260 nm to 1340 nm wavelength band, or a 1530 nm to 1611 nm wavelength band, or a 1565 nm to 1625 nm wavelength band, or a 1625 nm to 1675 nm wavelength band.

16. An optical transmission system, comprising:
a transceiver that generates at least one of a modulated light having an operating wavelength of greater than 1200 nm and modulated light having an operating wavelength range between 800-1100 nm;
a module;
a jumper cable optically coupling the transceiver and the module; and
a trunk cable optically coupled to the module,
wherein at least one of the jumper cable and the trunk cable comprises an optical fiber, the fiber including a core comprised of silica having a maximum relative refractive index delta of at least 0.7%, the core having a refractive index profile configured to be capable of transmitting light in a multimode propagation at every wavelength $\lambda_1$ between 800-1650 nm and to propagate light in a LP01 mode at a second wavelength $\lambda_2$, wherein the second wavelength $\lambda_2$ is greater than 1200 nm, the optical fiber exhibiting a modal bandwidth of at least 2 GHz·Km within the wavelength $\lambda_1$ in the range of 800-1650 nm and being structured to have a LP01 mode field diameter in the range of 8.5-12.5 µm at 1310 nm.

17. The optical transmission system according to claim 16, further comprising:
an MPO-to-LC fan-out cable optically coupled to the jumper and module, the fan-out cable comprising a multimode fiber and the jumper cable comprises the optical fiber, wherein a coupling loss between the fan-out cable and the jumper cable is less than or equal to about 3.0 dB.

18. The optical transmission system according to claim 16, wherein the trunk cable and the jumper cable comprises the optical fiber and the trunk cable has a length greater than 100 m and the jumper cable has a length less than 50 m.

19. An optical fiber comprising: a core comprised of silica with a core diameter and comprising, a maximum relative refractive index delta of at least 0.7% and an alpha value in the range of 1.9-2.2, the core having a refractive index profile configured to transmit light in a multimode propagation at every wavelength $\lambda_1$ in the range of 800-1650 nm, to exhibit a modal bandwidth of at least 2 GHz·Km within the wavelength $\lambda_1$ in the range of 800-1650 nm and to propagate light in a LP01 mode at a second wavelength $\lambda_2$, wherein the second wavelength $\lambda_2$ is greater than 1200 nm, the optical fiber being structured to have a LP01 mode field diameter in the range of 8.5-12.5 µm at a wavelength of 1310 nm.

20. The optical fiber of claim 19, wherein the maximum relative refractive index delta, delta $1_{max}$, is 1%≤delta $1_{max}$≤2%.

* * * * *